Oct. 26, 1965  F. W. R. STARP ETAL  3,213,771
STILL CAMERA WITH BUILT-IN EXPOSURE METER
Filed Oct. 12, 1962
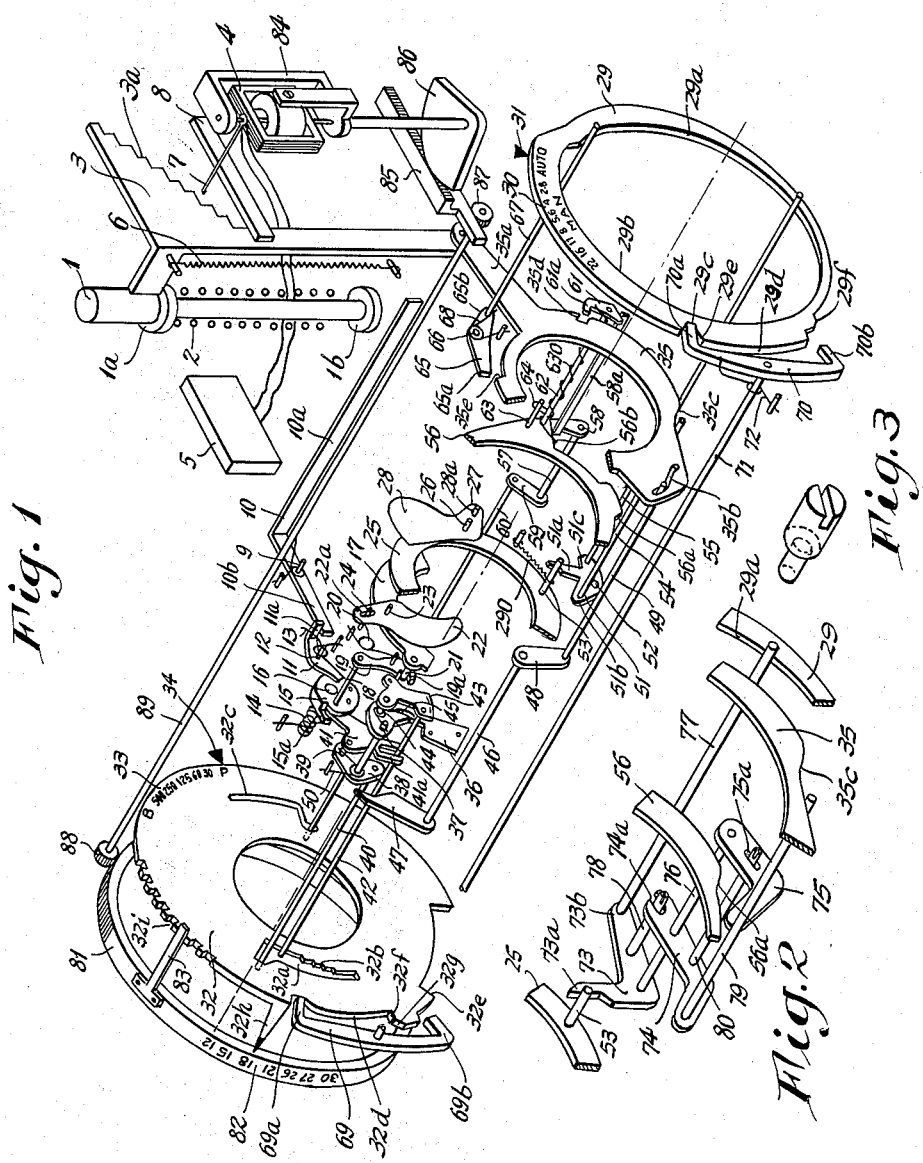
INVENTORS
Franz W. R. Starp
Dieter Rittmann
BY
Arthur A. March
ATTORNEY

United States Patent Office 3,213,771
Patented Oct. 26, 1965

3,213,771
STILL CAMERA WITH BUILT-IN
EXPOSURE METER
Franz W. R. Starp and Dieter Rittmann, Calmbach (Enz), Germany, assignors to Alfred Gauthier, G.m.b.H., Calmbach, Germany, a corporation of Germany
Filed Oct. 12, 1962, Ser. No. 230,232
Claims priority, application Germany, Oct. 14, 1961, G 33,341
13 Claims. (Cl. 95—10)

The present invention relates to a photographic still camera including a built-in exposure meter, a diaphragm control, and a shutter speed control. In particular the invention relates to such a camera in which the diaphragm and shutter speed controls can both be set to automatic positions for control by the exposure meter, or both can be set to manual positions for control independent of the exposure meter, or the shutter speed may be set for manual control, and the diaphragm may be set for automatic control by the exposure meter.

One object of the present invention is to provide a photographic camera having a relatively simple construction but capable of a comprehensive manner of operation covering three modes: independent manual control of the shutter speed and the diaphragm aperture; manual control of the shutter speed and automatic control of the aperture in accordance with both the chosen shutter speed and the amount of light reaching the camera from the scene to be photographed; and completely automatic exposure setting of both the shutter speed and the aperture as a function of the measurement of light by the built-in exposure meter.

In accordance with the present invention, this object is achieved by providing automatic shutter speed setting means having indicia covering a manual range of operation and having an additional position marked "program" which adjoins the shutter speed range, and by providing control parts, such as cams, by means of which the devices for setting shutter speed and aperture, which are connected with the exposure meter, can be connected by setting the shutter speed control to the "program" position so that, when the aperture control is set to its "automatic" position, both the exposure time and aperture parameters of the exposure are automatically determined in accordance with a time-aperture program as a function of the intensity of the light and of the film speed.

In a camera incorporating shutter mechanism in accordance with the present invention the exposure setting can be effected in three different ways. As a result such a camera is well adapted to any conceivable picture-taking situation, including both flash photographs and daylight photographs as well as snap-shots and "staged" pictures. Because it is possible to set the camera for manual control of the exposure parameters or for automatic control of the aperture along with manual control of the shutter speed or for completely automatic control of the exposure, the photographer can always take a picture with the type of exposure setting that is necessary in view of the nature of the scene or with an eye to obtaining the best results. It is of particular importance in this connection that the camera which is constructed in accordance with the present invention is required to have only two setting means: one to control the shutter speed either to a range of speeds or to a "program" position; and the other to control the diaphragm, which can be set either to a manually-determined range of apertures or to an automatic position. There is a great advantage in limiting the controls in this way and in not requiring additional setting means to achieve this variety of operating modes.

A simple embodiment of the camera and shutter mechanism of this invention is obtained by the fact that the setting devices for shutter speed and aperture comprise a setting member which is operatively connected with the exposure meter and that there are associated with this setting member control parts, for instance cams, which function, when the shutter speed setting member is set to its "program" position to operate a shutter speed escapement mechanism and a diaphragm actuating part, the setting member being adjustable to permit automatic exposure setting in accordance with a predetermined shutter speed aperture program. The disconnecting, or disabling, of the automatic program exposure and the switching of the camera to non-automatic shutter speed setting can be effected without the necessity of additional setting means or seting processes because of the fact that actuating devices are provided which are controlled by the shutter speed setting member when the latter is set to a chosen speed to eliminate the influence of the program setting means by the shutter speed escapement mechanism and of the means for controlling the diaphragm aperture, and because of the additional fact that a cam is associated with the shutter speed setting member to permit the adjustment of the escapement mechanism in the shutter speed range.

The different shutter speeds and automatic and nonautomatic control thereof can be obtained by means of a brake lever in the shutter speed escapement mechanism. This lever cooperates with the main drive part of the shutter and is pivotally attached to another lever which can be brought into operative connection with the cam of the program setting ring and can be held fast as a result of placing the shutter speed setting member in its manual range of operation in a position corresponding to the longest shutter speed which can be set. In so doing displacement of the brake lever by means of the cam associated with the shutter speed setting member is obtained in the shutter speed range. Thus one escapement mechanism serves for both manually set and automatically controlled shutter speeds.

Automatic adjustment of the aperture when the shutter speed has been manually selected can be effected by using a setting means which is different from the program setting means and which can be connected when the shutter speed setting means is set to the shutter speed range with the program setting means and thereby moved together with the latter. In addition there is associated with the automatic aperture setting means a cam which cooperates with the diapragm-actuating part for the shifting thereof and there is also an interlock controlled by the shutter speed setting means as well as an actuating device whereby, when the camera is set for automatic program exposure, the automatic aperture setting means can be held fast at an inactive position and the connection between the aperture setting means and the program setting means can be disconnected.

This embodiment has, in particular, the advantage that the transmission of the measurement of the exposure meter to the diaphragm, both upon automatic adjustment of the shutter speed and aperture and upon automatic adjustment of the aperture alone, is always carried out by the same element, namely the program setting means which, for this purpose, is in continuous operative connection with the exposure meter as a sole setting means. This greatly simplifies the apparatus, thus reducing its cost and making it more trouble-free.

A lever pivotally supported on one of the setting means and resiliently biased by a spring so as to engage a notch on the other setting means may be used to connect the program setting means and the automatic aperture setting means together. In order to keep the force of the spring acting on the lever from being exerted on the setting means, when the program setting means and the automatic aperture setting means are coupled together, so as to achieve an easy adjustment, free of strain, of the two setting means, one or more stops may be arranged to limit the depth of the engagement of the lever into the notch.

The control influence of the exposure meter can be disconnected in a simple manner when it is desired to operate the diaphragm without automatic control. Furthermore, this can be done without the necessity of acting on the exposure meter. In order to achieve this result an interlock is provided which can be brought into active position when the selector switch is set to the manual adjustment range and by means of which the program setting means can be locked in an inoperative position, and a cam which cooperates with the diaphragm actuating part is associated with the selector switch for manual adjustment of the aperture. It may also be desirable, in order to achieve complete and dependable elimination of errors in the operation of the camera, to provide two-way locks controlled by the shutter speed setting means and by the diaphragm control so that it is possible to switch the diaphragm control from its automatic position to its manual position while at the same time permitting the shutter speed setting means to shift to its "program" position only when the diaphragm control is in its "automatic" position.

In order to carry out B-exposures the shutter speed setting means has a position marked "B," and an interlock is provided which is controlled by the diaphragm aperture control and which permits the shutter speed setting means to be brought into the "B" position only when the diaphragm control is in its manual adjustment range, thereby increasing the utility of the invention by further preventing improper operation of the camera.

The transmission of the setting movements of the diaphragm aperture control, of the program setting means, and of the automatic setting means to the diaphragm actuating part, itself, can be effected in a simple manner with only a few parts by means of a pivotal transmission lever which is connected with the diaphragm actuating part and which has pins, or lugs, by means of which the lever may be controlled by the cams associated with the setting means.

Motion may be transmitted between the setting means in a different manner by way of individual, separate, transmission levers cooperating with the cam of the setting means in question, such levers being associated with the diaphragm control, the program setting means, and the automatic aperture setting means, one of the transmission levers cooperating with the aperture actuating part and all of the levers having a common supporting axis and pin-slot connections between themselves. In order to form a simple means of adjusting the mechanism the pins may be formed as rotatable eccentric structures.

The speed of the film used in the camera and the shutter speed set when taking pictures either with automatic program exposure or with automatic setting of the diaphragm together with preselection of the shutter speed can be taken into consideration by means of a simple structure which does not effect the different setting devices and which may be formed with a different setting means so arranged that the basic position of the measurement mechanism of the exposure meter can be varied. This simple structure can be coupled to the shutter speed means in different positions determined by a film speed scale.

A particularly compact over-all structure which is especially suitable for incorporation in photographic intralens shutters is obtained when the diaphragm control, the different setting means, and the diaphragm actuating part are in the form of rings or discs arranged so as to be coaxial with each other.

Details of the invention can be noted from the following specification together with the drawing in which:

FIG. 1 shows an embodiment in the subject matter of the invention in a perspective exploded view;

FIG. 2 shows a different embodiment for transmission of the setting movements of certain of the elements of FIG. 1; and FIG. 3 shows, on an enlarged scale, an eccentric pin used in the transmission device in accordance with FIG. 2.

In FIG. 1, a camera release, or shutter trigger, 1 can be moved against the action of a compression spring 2 and is guided in a camera housing, which has not been shown in order not to clutter the drawing. A feeler 3 is operatively connected to the trigger to engage a movable part 4 of an exposure meter which is installed in the camera and fed by the current of a photoelectric cell 5.

The feeler 3 is in the form of a slide which is movable parallel to the shutter trigger 1 and is held against a collar 1a of the camera release 1 by means of a spring 6. The spring 6 is somewhat weaker than the spring 2 associated with the camera release 1, so that when the release is not actuated, the feeler assumes its uppermost position, as shown in FIG. 1. For cooperation with the movable meter 4, the feeler 3 has a stepped edge 3a, one of the steps of which engages a pointer 7 of the movable meter part upon depression of the shutter trigger 1 and under the action of the spring 6, and presses the pointer against a stationary part 8.

On the trigger 1, there is a collar 1b which cooperates with a double-armed release lever 10 which is pivotally mounted on a stationary pin 9. One arm 10a of the release lever is bent at a right angle and lies in the path of movement of the collar 1b of the camera release, while a second arm 10b cooperates with a bent lug 11a of a locking lever 11. The lever 11 is pivotally supported by a stationary pin 12 and is held by a spring 13 against the arm 10b of the release lever 10. The lever 11 holds a main drive disc 15 of the shutter, which is resiliently biased by a drive spring 14, in the cocked position shown in FIG. 1. The disc 15 is arranged on a cocking shaft 16 which in its turn is connected with a well-known cocking device, such as the film transport mechanism of the camera.

The drive disc 15 actuates a shutter blade ring 17, and for this purpose, a pin 18 extends from the disc 15 and pivotally supports a drive pawl 19 which is biased by a spring 20 and acts by means of a notch 19a on a pin 21 of the shutter blade ring 17. The shutter blades 22, only one of which is shown in FIG. 1 in order not to clutter the drawing, are supported on pins 23 on the ring 17 and are guided by stationary pins 24 which extend through slots 22a. These elements operate in such a manner that, upon rotation of the drive disc 15 counterclockwise, the shutter blades 22 are given a reciprocating movement for the opening and closing of the shutter.

Coaxial with the shutter blade ring 17, but axially spaced therefrom, is a diaphragm-actuating ring 25. It bears supporting pin 26 for diaphragm blades 28 which are guided by means of stationary pins 27 that engage slots 28a, a spring 290 resiliently biases the ring 25 in its starting position, which corresponds to the largest aperture.

To permit pictures to be taken with either automatic and non-automatic adjustment of the aperture, the camera has a selector ring 29 which can be set to an "AUTO" (automatic) position and a "MAN" (manual or non-automatic) range. If this ring is in "AUTO" position, as shown in FIG. 1, the diaphragm actuating ring 25 is coupled in a manner which will be described in further detail below with the feeler 3, and the setting of the diaphragm aperture takes place as a function of the position of the movable part 4 of the exposure meter. On the other hand, within the range marked "MAN," the diaphragm is adjusted manually by means of a cam surface 29a which is formed on the ring 29 and acts on the diaphragm-actuating ring 25. The desired aperture can be set manually by reference to an aperture scale 30, which is provided on the ring 29, and a stationary mark 31.

The camera also has a shutter speed setting ring 32 which can be set by reference to an exposure time scale 33 associated with it in conjunction with a stationary mark 34. In accordance with the invention, there is another adjustment position "P" (program) adjoining the shutter speed range of the scale 33 on the ring 32. When the diaphragm aperture control 29 is set to its "AUTO" position, an automatic adjustment of the exposure to a predetermined shutter speed aperture program is obtained as a function of the intensity of the illumination. In this way, with a camera and shutter mechanism of the type defined by the present invention, it is possible in a simple, clear manner to take photographs in any of three modes: with manual exposure adjustment, with automatic aperture setting and manual setting of the shutter speed or with completely automatic exposure setting, or program setting.

For the automatic setting of the predetermined shutter speed aperture program, there is provided a rotatably mounted ring 35, hereinafter termed the program setting ring, which is connected by means of an arm 35a to the feeler 3. The ring 35 has a cam surface 35b which, when the shutter time setting ring 32 is set to the position "program," determines the setting of a shutter speed escapement mechanism, as is described in detail hereinafter. Another cam surface 35c on the ring 35 acts on the diaphragm-actuating ring 25 and thus sets the aperture in case of a completely automatic exposure. The cam surfaces 35b and 35c can, for instance, be so developed that shutter speed-aperture combinations of from 1/30 second and an aperture of 2.8 up to 1/500 second and an aperture of 22 can be set.

The shutter speed escapement mechanism itself consists of a supporting plate 36 on which a double-armed lever 38 is supported around the pin 37. The two arms of this lever are provided with pins 39 and 40 which extend in opposite directions. An escapement brake lever 41 which cooperates with the drive disc 15 of the shutter and which is provided with a slot guide 41a is pivotally supported on the pin 39. A pin 42 engages the slot guide 41a and is fastened to a toothed segment 43 which is in engagement with other standard parts (not shown) of the escapement. The segment 43 is pivotally mounted on a supporting pin 44 of the plate 36 and is under the action of a spring 45 which biases the escapement mechanism in the starting position shown in FIG. 1. The position depicted is associated with the slowest shutter speed, and is the position in which the pin 42 is against the plate 36.

Different shutter speeds are obtained by means of the escapement mechanism by setting the brake lever 41 in different relative positions with respect to the lug 15a of the drive disc 15. The effect of doing so is that, as the drive disc 15 rotates, its lug 15a cooperates over a shorter or longer distance with the brake lever. The drive disc swings the lever 41 around the pin 39 and, after moving over a length of path which determines the duration of the exposure, passes out of engagement with the lever.

For setting the brake lever 41 when taking photographs with automatic program exposure, there is used, as already mentioned, the cam surface 35b which is located on the program setting ring 35 and acts on the carrier lever 38 of the brake lever 41. Between the cam surface 35b and the lever 38 is a transmission device which comprises, inter alia, a shaft 46 to one end of which is fastened a lever 47 that cooperates with the pin 40 of the lever 38. On the other end of the shaft is a lever 48 with a pin 49 that acts on the cam surface 35b. The carrier lever 38 is under pressure from a spring 50, which drives it in clockwise direction and thus presses the pin 40 against the lever 47.

The control of the program setting ring 35 on the exposure escapement mechanism can be disconnected as a function of the setting of the shutter speed setting ring 32 on the shutter speed range indicated by the scale 33 by bringing the carrier lever 38 into a starting position which corresponds to the slowest shutter speed obtainable. For this purpose, there is a cam surface 32a on the shutter speed setting ring 32 with which the pin 40 of the lever 38 cooperates under the pressure of the spring 50. The shape of the cam surface 32a is such that in the "program" position of the shutter speed setting ring, the lever 38 can be freely moved, while upon shifting the ring 32 to the shutter speed range of the scale 33, the lever 38 is moved by means of the cam surface 32a into the starting position and is held in this position as long as the ring 32 is at any point in the range of the scale 33. Instead of the cam surface 35b, the shutter speed escapement mechanism is now adjusted by a cam surface 32b of the shutter speed setting ring 32 with which the pin 42 cooperates. The latter is fastened in the manner already described to the toothed segment 43 of the escapement mechanism and engages the slot guide 41a of the brake lever 41.

The setting of the aperture is effected in the case of pictures taken with automatic program exposure by means of the cam surface 35c located on the program setting member 35, which cam surface cooperates with the diaphragm-actuating ring 25. Between the cam surface 35c and the ring 25 is inserted a transmission device which comprises a lever 51. This lever is pivotally supported on a pin 52 and has an arm 51a against which a pin 53 of the diaphragm actuating ring 25 rests by virtue of pressure of the spring 29o. The other arms 51b and 51c of the lever bear pins 54 and 55, respectively, the pin 54 cooperating with the cam surface 35c, while the pin 55 produces the connection with the cam surface 29 of the selector ring 29.

Shifting the shutter speed setting ring from the "program" position to the shutter speed range marked by the scale 33 results not only in disconnecting the control surface 35b from the shutter speed escapement mechanism, but also in eliminating the control of the cam surface 35c from the diaphragm-actuating ring 25. This is effected by bringing into operation a cam surface 56a which, when the selector ring 29 is set at "AUTO" brings about the automatic setting of the aperture. The cam surface 56a is on a ring 56 which is referred to hereinbelow as the automatic aperture setting ring. It cooperates with the pin 54 of the transmission lever 51 and, for reasons which will be indicated below, leads the cam surface 35c of the program setting ring 35 by one aperture interval.

When the shutter time setting ring 32 is moved to its "program" setting, the ring 56 is held fast by means of a locking device in the starting position shown in FIG. 1. In this position the cam surface 56a is outside the path of movement of the pin 54. The locking device comprises a locking lever 58 which is fastened on a shaft 57 and cooperates with a projection 56b of the automatic diaphragm setting ring 56. On the shaft 57 a lever 59 is also provided which engages, by means of a pin 60, in the control slot 32c of the shutter speed setting ring 32. When the shutter speed setting ring is set to "program" the lever 58 assumes the locking position shown in the drawing and is removed, as a result of the setting of the shutter speed setting ring to the shutter speed range, from engagement with the projection 56b, which unlocks the ring 56.

In order to bring about an automatic setting of the aperture by means of the cam surface 56a, the ring 56 can be connected as a result of the setting of the shutter speed setting ring 32 on the shutter speed range, with the program setting ring 35 connected to the feeler 3 and can be moved together with the latter. The connection between the two rings is produced by a lever 61 which is supported on ring 56 around pin 62 and is urged in the counterclockwise direction by a spring 630. For cooperation with the ring 35 the lever 61 has a projection 61a which can be brought into engagement with a notch 35d on the ring 35. Movement of the projection 61a into and out of engagement with the recess 35d is effected in the example shown by an arm 58a bent at an angle from the locking lever 58 and extending into the path of movement of the lever 61.

If the shutter speed setting ring 32 is in the "program" position, the connection between the rings 56 and 35 is interrupted and the ring 56 is locked in its starting position. When the ring 32 is set to the shutter speed range, the locking lever 58, on the other hand, releases the ring 56 and the lever 61 at the same time so that the latter can snap, under the action of its spring 63o, into the recess 35d and thus produce the desired connection between the rings 56 and 35.

The depth of enagement of the projection 61a into the recess 35d is limited by stop pins 63 and 64 fastened to the ring 56 and to the pin 62. The purpose of this is to prevent the force of the spring 63o, which acts on the lever 61, from acting radially, in the form of the pressure of the lever, on the program setting ring and thereby impairing the ease of movement of the rings 35 and 56 when these rings are connected with each other.

With the ring 35, there is also associated a locking lever 65, the purpose of which is to hold the ring 35 as well as the feeler 3 in their initial positions shown in FIG. 1, in case of non-automatic adjustment of the aperture by means of the selector ring 29, and in this way exclude their control action on the diaphragm actuating ring 25. The lever 65 is pivotally supported on a pin 66 and its arm 65a cooperates with the projection 35e of the program setting ring 35. The other arm 65b of the lever bears a pin 67 which, because of the force of a spring 68, rests against the inner periphery of the selector ring 29. When the selector ring is in its "AUTO" position, the highest position of the cam surface 29a is opposite the pin 67 and holds the locking lever 65 in the inactive position shown in FIG. 1 in opposition to the spring action. If the ring 29, on the other hand, is turned to its "MAN" range, the pin 67 passes into the region of the lower peripheral portion 29b of the ring 29. The resultant swinging movement of the lower 65 brings the arm 65a of said lever into the path of motion of the projection 35e of the program setting ring 35 and locks the latter against clockwise movemet. The cam surface 29a of the selector ring 29 now controls the setting of the aperture via the pin 55 and the lever 51 on the diaphragm actuating ring 25.

Between the rings 29 and 32, there is an alternate lock which permits the selector ring 29 to shift from "AUTO" position to "MAN" position and, on the other hand, permits the shutter speed setting ring 32 to shift from the shutter speed range to the "program" position only when the shutter speed setting ring is within the shutter speed range and the selector ring is in the "automatic" position respectively. The lock comprises two locking levers 69 and 70 which are fastened to a rotatable shaft 71 and are biased in clockwise direction by a spring 72 attached to lever 70. The arm 70a of the lever 70 cooperates with a recess 29c in the periphery of the ring 29 and associated with the "AUTO" position of the ring, while the lever 69 acts on the shutter speed setting ring 32 and rests, via its arm 69a, against a cam surface 32d of the ring. The shape of this cam surface is such that in the "program" position of the shutter speed setting ring, the arm 70a of the lever 70 engages under the action of the spring 72 into the recess 29c of the ring 29 and thus prevents displacement of the ring from the "AUTO" position into the "MAN" range. If, on the other hand, the shutter speed setting ring 32 is set to the shutter speed range of the scale 33, the lever 69 is swung in counterclockwise direction by the cam surface 32d. This causes the arm 70a of the lever 70 to be lifted out of the recess 29c of the ring 29 so that the ring 29 can now be set on the range characterized by "MAN." Within this range, the arm 70a of the lever 70 rests against a peripheral portion 29d of the ring 29, while the arm 69b of the lever 69 is in the path of motion of a projection 32e of the shutter speed setting ring 32. In this way, the return of the shutter speed setting ring to the "program" position is not possible as long as the selector ring 29 is set at the "MAN" range. Release of the locking of the shutter speed setting ring in the shutter speed range effected by the arm 69b takes place when the selector ring 29 is moved into the "AUTO" position, whereupon the arm 70a of the lever 70 drops into the recess 29c of the ring 29 so that the arm 69b of the lever 69 is moved out of the range of the projection 32e.

In order to make "B" exposures, there is also associated with the shutter speed setting ring 29, a "B" setting position which is located on the lefthand end of the shutter speed scale 33. When the shutter speed setting ring is set at "B," a device known per se and which is not shown in detail in order not to clutter the drawing, is connected to cooperate with a part of the shutter drive mechanism, for instance with the main drive disc 15 of the shutter, so that when a picture is taken, the disc 15 is held in a position corresponding to the open position of the shutter blades until the shutter trigger, or camera release 1, is again let go.

The setting of the shutter speed setting ring 32 to "B" is possible only when the aperture has been previously shifted by the selector ring 29 to manual adjustment. For this purpose, there is located on the shutter speed setting ring a projection 32f which, when the shutter reaches the speed time 1/500 second, strikes against the arm 69a of the lever 69 when the selector ring 29 is in "AUTO" position. If the selector ring 29 is now brought to "MAN," the arm 70a of the lever 70 travels upward on the cam surface portion 29e and turns the levers 70 and 69 counterclockwise. As a result, the arm 69a of the lever 69 is swung out of the path of the projection 32f so that the "B" lock is removed. If the shutter speed setting ring 32 is then set to "B," the levers 69 and 70 are moved still farther in the counterclockwise direction by the cam surface 32g adjoining the projection 32f. This causes the arm 70b of the lever 70 to drop behind the projection 29f of the ring 29 with the result that the ring 29 cannot be turned to "AUTO" position as long as the shutter speed setting ring 32 is at "B."

In the example shown in FIG. 1, the transmission of the setting movements of the selector ring 29, the program setting ring 35, and the automatic aperture setting ring 56 to the diaphragm-actuating ring 25 takes place by means of a single transmission lever 51, which is positively connected with the diaphragm-actuating ring and which follows the cam surfaces of the setting rings by means of pins 54, 55. In contradistinction to this, in the case of the transmission device shown in FIG. 2 there is associated with each of the setting rings 29, 35 and 56, a special transmission lever 73, 74, and 75, respectively, which are displaceably supported on a common pin 76. The lever 73 associated with the selector ring 29 has its arm 73a resting against the pin 53 of the diaphragm actuating ring 25, while its other arm 73b bears a pin 77 which cooperates with the cam surface 29a of the ring 29. Furthermore, the lever 73 is in engagement, via a pin 78 arranged on it, with a slot guide 74a of the lever 74. The lever 74 in its turn bears pins 79 and 80, the pin 79 cooperating with the cam surface 35c of the ring 35 while the pin 80 engages in a slot 75a of the lever 75 which follows the cam surface 56a of the automatic aperture setting ring 56.

The pins 77, 78 and 80 may be formed as eccentric pins, the shape of which is shown in FIG. 3. This makes it a simple matter to adjust each of the individual levers 73, 74 and 75 to obtain optimum accuracy in the transmission of the setting movements of rings 29, 35 and 56 to the diaphragm actuating ring 25.

In order to adjust for the speed of the film used, a ring 81 is arranged coaxial to the shutter speed setting ring 32. This ring 81 which can be set by means of a film speed scale 82 arranged on it, cooperates with a pointer 32h of the shutter speed setting ring 32. The ring 81 is detachably coupled with the shutter speed setting ring 32 and can be set with respect to the latter in various relative positions, identified by the marks of the scale 82. For this purpose, the ring 32 bears notches 32i into which a spring tongue 83 fastened to the film speed setting ring 81 fits. In order to set for a particular film speed, the spring tongue 83 is lifted by hand out of the notches 32i of the shutter speed setting ring 32 and the ring 81 is then turned with respect to the ring 32 until the new film speed value on the scale 82 is opposite the pointer 32h.

The positions to which the shutter speed and film speed controls 32 and 81 are set in case of automatic setting of the aperture of the shutter speed and diaphragm respectively, are used to influence the movable meter part 4. A support 84 for the movable meter part 4 is rotatable as a function of the displacement of the rings 32 and 81, whereby a change in the relative position of the part 4 is produced. The connection between the rings 32, 81 and the support 84 comprises, inter alia, a rack 85 which meshes with a toothed segment 86 fastened to the support 84 and with a pinion 87. This pinion is located, along with a second pinion 88 on a shaft 89, and the second pinion meshes with a toothed portion of the ring 81.

The film speed and the shutter speed set could also be taken into consideration differently by means of a shadowing device of known construction connected with the rings 32 and 81 and located in front of the photoelectric cell 5 of the exposure meter, or by means of a resistance which may be varied as a function of the adjustment of the rings 32 and 81 and which could be connected in the circuit of the illumination measuring device 5.

When the shutter speed setting ring 32 is shifted from position "P" to the time of 1/30 sec., the coil 4 is displaced by one interval. This displacement is compensated for, as has already been mentioned, by virtue of the fact that the cam surface 56a of the automatic aperture setting ring 56 starts one interval earlier than the cam surface 35c of the program setting ring 35.

The manner of action and operation of the camera in accordance with the invention is as follows:

In FIG. 1 the camera is set to automatic exposure setting determined by the intensity of illumination and the film speed set in accordance with a fixed predetermined shutter speed/aperture program, for which purpose the shutter speed setting ring 32 has been brought into the position "P" and the selector ring 29 into the position "AUTO." If, with this setting of the camera, the trigger 1 is depressed to take a picture, the feeler 3 follows this motion under the action of its spring 6 until one of the steps 3a comes against the meter pointer 7. Due to this movement of the feeler, the program setting ring 35 is turned in clockwise direction. This, in its turn, forces the pin 49 of the level 48, which cooperates with the shutter speed escapement mechanism, to slide along the setting cam surface 35b of the ring 35 and to adjust the shutter speed according to the path traversed by displacement of the lever 38 and thus of the brake lever 41. At the same time, due to rotation of the ring 35, the aperture setting cam surface 35c also enters into action by swinging the transmission lever 51 in counterclockwise direction by way of the pin 54. The lever 51, in its turn, brings the diaphragm actuating ring 25 and the diaphragm blades 28, which are in operative connection with it, into a specific position which corresponds to the path traveled by the ring 35. The automatic exposure setting in accordance with a fixed predetermined shutter speed/aperture program is thus completed and upon further depression of the release 1, the shutter is now released to take the picture.

As soon as the release 1 is relieved of load after the picture has been taken, the feeler 3 moves back again into its initial position under the action of the spring 2 acting on the release 1. The same is true of the ring 35 which is also returned into the position shown in FIG. 1.

In order to take pictures with automatic diaphragm setting controlled by the exposure meter it is merely necessary to rotate the shutter speed setting ring 32 to place the desired shutter speed contained in scale 33 opposite the fixed mark 34. With this setting, the lever 38 is swung out of the range of motion of the lever 47 by the cam surface 32a of the ring 32 and thus the control exerted by the program setting ring 35 on the shutter speed escapement mechanism is done away with. Instead of the cam surface 35b, the cam surfaces 32b of the shutter speed setting ring 32 now serves to adjust the shutter speed escapement mechanism by means of the pin 42 on the brake lever 41 of the escapement mechanism. Furthermore, due to the setting of the exposure time by means of the cam surface 32c of the shutter speed setting ring, the locking lever 58 is swung in clockwise direction and the lock of the automatic diaphragm setting ring 56 is opened. As a result, the lever 61 drops into the recess 35d of the ring 35 and thus connects the rings 56 and 35 together.

After the shutter speed has been set, the release 1 of the camera can be actuated, whereby the rings 35 and 56 are displaced jointly by the feeler 3. To do so, the cam surface 56a associated with the automatic aperture setting ring 56 enters into action and swings the transmission level 51 in counterclockwise direction by means of the pin 54. This movement of the transmission lever effects the setting of the diaphragm blades 28 in the same manner as already explained above.

In order finally to be able to adjust the camera entirely independently of the influence of the exposure meter, i.e. to set both the shutter speed and the aperture manually, there is associated with the selector ring 29, as already described, an aperture setting cam surface 29a as well as an aperture setting scale 30. If the photographer wishes to effect the setting of the diaphragm as well as the manual setting of the shutter speed by hand, he need merely turn the selector ring 29 towards the right from the "AUTO" position until the desired aperture value on the scale 30 is opposite the stationary mark 31. In this process, the setting cam surface 29a of the selector ring acts on the pin 55 of the transmission lever 51 and turns the lever counterclockwise around its pin 52. Due to the positive connection 51a, 53 the diaphragm actuating ring 25 is turned in a clockwise direction and the diaphragm blades 28 are brought into a position corresponding to the aperture setting.

In case of non-automatic setting of the aperture, the locking lever 65 is brought into active position so that upon the actuation of the camera release 1, the feeler 3 and the program setting ring 35 connected with it remain in the starting position shown in FIG. 1, in which position their influence on the diaphragm actuating ring 25 is eliminated.

What is claimed is:

1. A photographic camera comprising an adjustable diaphragm; automatic means comprising an exposure meter and a program setting member linking said meter to said diaphragm to control the aperture size of the latter automatically in response to the amount of light striking said exposure meter; a manually operable diaphragm aperture control connected to said diaphragm to control the aperture size thereof, said control having a plurality of positions including an automatic position and at least one manual position; a connection from said diaphragm aperture control to said automatic means to disable said program setting member when said diaphragm aperture control is set at said manual position; a shutter; a linkage connecting said program setting member to said shutter to control the duration of opening of said shutter automatically in accordance with the amount of light striking said exposure meter, said linkage being automatically disabled when said program setting member is disabled; a manually operable shutter speed setting control connected to said shutter and having at least one program position and at least one manual position; an automatic aperture setting member connectable to said diaphragm to control the aperture size of the latter when said shutter speed setting control is set to its manual position; and force-transmitting means connecting said shutter speed setting control to said automatic means to move said automatic means in accordance with the setting of said exposure time setting member to its manual position whereby said diaphragm will be automatically set to an aperture value determined by the shutter speed to which said exposure time setting member is set and to the intensity of light striking said exposure meter.

2. A photographic camera comprising an adjustable diaphragm; automatic means comprising an exposure meter and a program setting member linking said meter to said diaphragm to control the aperture size of the latter automatically in response to the amount of light striking said exposure meter; a manually operable diaphragm aperture control connected to said diaphragm to control the aperture size thereof, said control having a plurality of positions including an automatic position and at least one manual position; a lock engageable with said program setting member, said lock being connected to said diaphragm aperture control to be operated thereby to lock said program setting member in its initial position when said diaphragm aperture control is set in its manual position; a shutter; a linkage connecting said program setting member to said shutter to control the duration of opening of said shutter automatically in accordance with the amount of light striking said exposure meter, said linkage being automatically disabled when said program setting member is disabled; a manually operable shutter speed setting control connected to said shutter and having at least one program position and at least one manual position; an automatic aperture setting member connectable to said diaphragm to control the aperture size of the latter when said shutter speed setting control is set to its manual position; locking means connected to said shutter speed setting control to lock said automatic aperture setting member to said program setting member when said shutter speed setting control is set to its manual position; and force-transmitting means connecting said shutter speed setting control to said automatic means to move said automatic means in accordance with the setting of said exposure time setting member to its manual position whereby said diaphragm will be automatically set to an aperture value determined by the shutter speed to which said exposure time setting member is set and to the intensity of light striking said exposure meter.

3. A photographic camera comprising an adjustable diaphragm; automatic means comprising an exposure meter and a program setting member linking said meter to said diaphragm to control the aperture size of the latter automatically in response to the amount of light striking and exposure meter; a manually operable diaphragm aperture control connected to said diaphragm to control the aperture size thereof, said control having a plurality of positions including an automatic position and at least one manual position; a connection from said diaphragm aperture control to said automatic means to disable said program setting member when said diaphragm aperture control is set at said manual position; a shutter; a driving mechanism for opening and closing said shutter; a first linkage connecting said program setting member to said driving mechanism to control the duration of opening of said shutter automatically in accordance with the amount of light striking said exposure meter, said linkage being automatically disabled when said program setting member is disabled; a manually operable shutter speed setting control having at least one program position and at least one manual position; a second linkage connecting said shutter speed setting control to said driving mechanism to control the operation of said shutter and to disconnect said first linkage from said shutter when said shutter speed control is set to its manual position; an automatic aperture setting member connectable to said diaphragm to control the aperture size of the latter when said shutter speed setting control is set to its manual position; locking means connected to said shutter speed setting control to lock said automatic aperture setting member to said program setting member when said shutter speed setting control is set to its manual position; and force-transmitting means connecting said shutter speed setting control to said automatic means to move said automatic means in accordance with the setting of said exposure time setting member to its manual position whereby said diaphragm will be automatically set to an aperture value determined by the shutter speed to which said exposure time setting member is set and to the intensity of light striking said exposure meter.

4. A photographic camera comprising an adjustable diaphragm; automatic means comprising an exposure meter and a program setting member linking said meter to said diaphragm to control the aperture size of the latter automatically in response to the amount of light striking said exposure meter; a manually operable diaphragm aperture control connected to said diaphgram to control the aperture size thereof, said control having a plurality of positions including an automatic position and at least one manual position; a connection from said diaphragm aperture control to said automatic means to disable said program setting member when said diaphragm aperture control is set at said manual position; a shutter; a linkage connecting said program setting member to said shutter to control the duration of opening of said shutter automatically in accordance with the amount of light striking said exposure meter, said linkage being automatically disabled when said program setting member is disabled; a manually operable shutter speed setting control connected to said shutter and having at least one program position and at least one manual position; an automatic aperture setting member connectable to said diaphgram to control the aperture size of the latter when said shutter speed setting control is set to its manual position; first locking means connected to said shutter speed setting control to lock said automatic aperture setting member to said program setting member when said shutter speed setting control is set to its manual position; force-transmitting means connecting said shutter speed setting control of said automatic means to move said automatic means in accordance with the setting of said exposure time setting member whereby said diaphragm will be automatically set to an aperture value determined by the shutter speed to which said exposure time setting member is set and to the intensity of light striking said exposure meter; and second locking means connected to said diaphragm aperture control and to said shutter speed setting control to permit said diaphragm aperture control to be set to its manual position only when said shutter speed control has been previously set to its manual position.

5. The invention according to claim 4, characterized by the fact that in order to take B exposures, another setting position "B" is associated with said shutter speed control, and that a lock controlled by said diaphragm aperture control is provided which permits setting of said shutter speed control into the "B" position only when said second means is in its manual setting range.

6. The invention of claim 4, corresponding a film speed control which may be adjustably connected to said shutter speed control and to said exposure meter to control the operation of said exposure meter according to film speed.

7. The invention according to claim 4, characterized by the fact that there are associated with said program setting member, said diaphragm aperture control, and said automatic aperture setting member, first, second and third levers cooperating, respectively, with said program setting member, said diaphragm aperture control, and said automatic aperture setting member, means, and that the levers have a common supporting pin and that there are arranged between said levers pin-slot connections.

8. The invention of claim 7 in which said pin-slot connections comprise pins having one portion which is eccentric with respect to another portion and said pins are turnable.

9. A photographic camera comprising an adjustable diaphragm; automatic means comprising an exposure meter and a program setting ring connected to said meter to be rotated thereby; a cam on said ring; a cam follower engaging said cam and connected to said diaphragm to control the aperture size of the latter automatically in response to the amount of light striking said meter; a manually operable diaphragm aperture control connected to said diaphragm to control the aperture size thereof, said control having a plurality of positions including an automatic position and at least one manual position; a connection from said piaphragm aperture control to said automatic means to disable said program setting ring when said diaphragm aperture control is set at said manual position; a shutter; a linkage connecting said program setting ring to said shutter to control the duration of opening of said shutter automatically in accordance with the amount of light striking said exposure meter, said linkage being automatically disabled when said program seting ring is disabled; a manually operable shutter speed setting control connected to said shutter and having at least one program position and one manual position; an automatic aperture setting member connectable to said diaphragm to control the aperture size of the latter when said shutter speed setting control is set to its manual position; locking means connected to said shutter speed setting control to lock said automatic aperture setting member to said program setting ring when said shutter speed setting control is set to its manual position; and force-transmitting means connecting said shutter speed setting conrol to said automatic means to move said automatic means in accordance with the setting of said exposure time setting member to its manual position whereby said diaphragm will be automatically set to an aperture value determined by the shutter speed to which said exposure time setting member is set and to the intensity of light striking said exposure meter.

10. A photographic camera comprising an adjustable diaphragm; automatic means comprising an exposure meter and a program setting ring connected to said exposure meter to be rotated thereby; first and second cams on said ring; a first cam follower engaging said first cam and connected to said diaphragm to control the aperture size of the latter automatically in response to the amount of light striking said exposure meter; a manually operable diaphragm aperture control connected to said diaphragm to control the aperture size thereof, said control having a plurality of positions including an automatic position and at least one manual position; a connection from said diaphragm aperture control to said automatic means to disable said program setting ring when said diaphragm aperture control is set at said manual position; a shutter; a second cam follower engaging said second cam and connected to said shutter to control the duration of opening of said shutter automatically in accordance with the amount of light striking said exposure meter; a manually operable shutter speed setting control having at least one program position and at least one manual position; means connecting said shutter speed setting control to shutter to control the operation thereof and to disengage said second cam follower from said shutter when said shutter speed control is set at its manual position; an automatic aperture setting ring connectable to said diaphragm to control the aperture size of the latter when said shutter speed setting control is set to its manual position; and force-transmitting means connecting said shutter speed setting control to said automatic means to move said automatic means in accordance with the setting of said exposure time setting member to its manual position whereby said diaphragm will be automatically set to an aperture value determined by the shutter speed to which said exposure time setting member is set and to the intensity of light striking said exposure meter.

11. A photographic camera comprising an adjustable diaphragm; automatic means comprising an exposure meter and a program setting ring connected to said exposure meter to be rotated thereby; first and second cams on said ring; a first cam follower engaging said first cam and connected to said diaphragm to control the aperture size of the latter automatically in response to the amount of light striking said exposure meter; a manually operable diaphragm aperture control connected to said diaphragm to control the aperture size thereof, said control having a plurality of positions including an automatic position and at least one manual position; a connnection from said diaphragm aperture control to said automatic means to disable said program setting ring when said diaphragm aperture control is set at said manual position; a shutter; a second cam follower engaging said second cam and connected to said shutter to control the duration of opening of said shutter automatically in accordance with the amount of light striking said exposure meter; a manually operable shutter speed setting control having at least one program position and at least one manual position; means connecting said shutter speed setting control to said shutter to control the operation thereof and to disengage said second cam follower from said shutter when said shutter speed control is set at its manual position; an automatic aperture setting ring connectable to said diaphragm to control the aperture size of the latter when said shutter speed setting control is set to its manual position; locking means connected to said shutter speed setting control to lock said automatic aperture setting ring to said program setting ring when said shutter speed setting control is set to its manual position; and force transmitting means connecting said shutter speed setting control to said automatic means to move said automatic means in accordance with the setting of said exposure time setting member to its manual position whereby said diaphragm will be automatically set to an aperture value determined by the shutter speed to which said exposure time setting member is set and to the intensity of light striking said exposure meter.

12. The invention of claim 11 in which said lock comprises a spring-biased lever and in which said automatic aperture setting ring has a stop to limit the movement of said lever to prevent undue force on said program setting ring.

13. A photographic camera comprising an adjustable diaphragm; automatic means comprising an exposure meter and a program setting member linking said meter to said diaphragm to control the aperture size of the latter automatically in response to the amount of light striking said exposure meter; a manually operable diaphragm aperture control connected to said diaphragm to control the aperture size thereof, said control having a plurality of positions including an automatic position and at least one manual position; a connection from said diaphragm aperture control to said automatic means to disable said program setting member when said diaphragm aperture control is set at said manual position; a shutter; a linkage connecting said program setting member to said shutter to control the duration of opening of said shutter automatically in accordance with the amount of light striking said exposure meter, said linkage being automatically disabled when said program setting member is disabled; a manually operable shutter speed setting control connected to said shutter and having at least one program position and at least one manual position; an automatic aperture setting member connectable to said diaphragm to control the aperture size of the latter when said shutter speed setting control is set to its manual position; locking means connected to said shutter speed setting control to lock said automatic aperture setting member in its starting position when said shutter speed setting member is set in its program position and to lock said automatic aperture setting member to said program setting member when said shutter speed setting control is set to its manual position; and force-transmitting means connecting said shutter speed setting control to said automatic means to move said automatic means in accordance with the setting of said exposure time setting member to its manual position whereby said diaphragm will be automatically set to an aperture value determined by the shutter speed to which said exposure time setting member is set and to the intensity of light striking said exposure meter.

References Cited by the Examiner
UNITED STATES PATENTS

| | | | |
|---|---|---|---|
| 3,013,478 | 12/61 | Gebele | 95—10 |
| 3,065,683 | 11/62 | Gebele | 95—10 |
| 3,071,054 | 1/63 | Singer | 95—10 |

NORTON ANSHER, *Primary Examiner.*

DELBERT B. LOWE, *Examiner.*